April 1, 1969 H. LANGE 3,436,286

POLISHING METHOD FOR THE REMOVAL OF MATERIAL FROM MONOCRYSTALLINE SEMICONDUCTOR BODIES

Filed April 17, 1967

United States Patent Office 3,436,286

Patented Apr. 1, 1969

3,436,286

POLISHING METHOD FOR THE REMOVAL OF MATERIAL FROM MONOCRYSTALLINE SEMICONDUCTOR BODIES

Herbert Lange, Ubersee am Chiemsee, Germany, assignor to Siemens Aktiengesellschaft, a corporation of Germany Continuation-in-part of application Ser. No. 355,338, Mar. 27, 1964. This application Apr. 17, 1967, Ser. No. 633,669

Claims priority, application Germany, Mar. 28, 1963, S 84,437

Int. Cl. B08b *3/08;* C23f *1/02*

U.S. Cl. 156—17 15 Claims

ABSTRACT OF THE DISCLOSURE

Polishing method for removing material from surfaces of monocrystalline semiconductor bodies includes simultaneously supplying at least two different, coactively polishing chemical agents, specific for etching the semiconductor bodies, at a given rate to spaced locations on the upper surface of a rotary, substantially horizontal platform, and bringing a surface of a semiconductor body into engagement with the upper surface of the rotary platform so that it is repeatedly subjected to each of the different chemical polishing agents. The method also includes removing the polishing agents from the rotary platform at approximately the same rate as they are supplied thereto.

Figure 1:
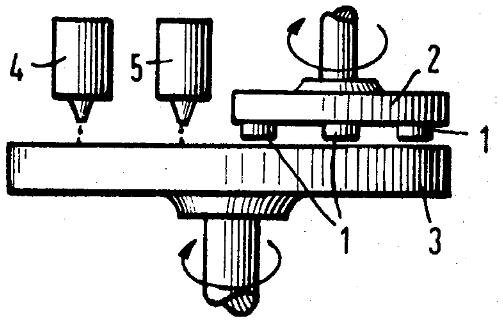

My invention relates to a method of polishing monocrystalline semiconductor bodies, particularly those in the shape of flat discs, for the purpose of removing material therefrom. This application is a continuation-in-part of my application Ser. No. 355,338, filed Mar. 27, 1964.

As a rule, the production of electronic semiconductor devices requires the use of monocrystalline semiconductor discs which are to be coated with further semiconductor material or to be doped or contacted with other materials by an alloying or diffusion process. For satisfactory results, the surface of the discs must be planar and smooth without irregularities. Still more exacting demands are to be met if monocrystalline layers are to be precipitated upon the discs. This requires that the substrate surface have a virtually ideal, faultless crystalline constitution, because a fault in a substrate surface becomes greatly augmented in the subsequently grown coating of precipitating semiconductor material, the defect increasing with the thickness of such coating. The disc surfaces must also be planar parallel, especially when metals or other substances are to be alloyed into these surfaces. This is because the alloying fronts, such as the active boundaries or emitter and collector in an alloy-bonded transistor must extend in planar-parallel relation to each other for high-quality performance.

In most cases, the semiconductor discs are produced by cutting or sawing them from elongated semiconductor rods, for example perpendicularly to the longitudinal axis. The surface of the semiconductor slices often exhibits fissures and mostly is rather rough. The mechanical slicing also causes fine cracks and gaps in the semiconductor surface due to the brittleness of most semiconductor materials, particularly silicon and germanium, such cracks often extending down to a depth of 10 microns or more. In this surface region the crystalline structure is damaged or destroyed. The defective surface region, as a rule, must be removed, and the crystal must be further reduced in thickness until a crystal layer free of structural faults is exposed at the surface. This has been done by mechanical processing with grinding or polishing agents. The improvement in surface condition in most cases is achieved stepwise by reducing the grain size of the grinding or polishing agent from stage to stage. The sometimes rather coarse grain employed at the beginning of the process may cause additional structural surface faults, so that the next following processing stage, performed with the aid of a more finely granular polishing agent, must first remove the uppermost, defective layer. Required in the last stage of such processing is a polishing agent of extremely fine, for example 10 millimicron granulation, in order to secure an undisturbed semiconductor surface satisfying the exacting requirements of semiconductor techniques. Thus, a rather thick layer must be eliminated in many cases, so that very long over-all periods of processing time are needed.

According to another known method, the disturbed crystalline surface layer is removed by treatment with chemical agents. This does not produce new structural crystal disturbances and requires less processing time. However, the results fall short of meeting the demands of semiconductor techniques because such chemical removal is non-uniform. Generally, a chemical polishing agent attacks the edge of the discs more strongly so that the planar shape of the disc is often lost; but such a shape is absolutely necessary for certain types of further fabrication resulting in various semiconductor devices, for example by growing a monocrystalline surface layer upon the disc surface.

It is an object of my invention to devise a method for the removal of material from monocrystalline semiconductor bodies, particularly in the shape of planar wafers or discs, that avoids the deficiencies and shortcomings of the known methods and reliably secures obtaining the desired accurately planar shape and crystalline perfection of the surfaces.

To this end, and in accordance with my invention, the semiconductor bodies are placed on a rotary platform such as a polishing disc of a mechanical polishing device, for example a polishing machine, and are alternately subjected in the same device to at least two different chemical agents which coactively impose a chemical polishing effect upon the semiconductor bodies. These respective chemical agents are supplied simultaneously and spatially separately to the polishing device and are removed from the frictionally active region of that device at approximately the same rate. Chemical agents which, when thus brought together, have jointly a polishing effect upon crystalline bodies of germanium, for example, are hydrogen peroxide and aqueous sodium hydroxide, both applicable in aqueous or other dilution, as will be set forth hereinbelow. Suitable for silicon are aqueous solutions of hydrofluoric acid and nitric acid, for example.

As a rule, the chemically active agents are applied in solution. Preferably employed as a solvent is water, although non-aqueous solvents are also suitable. For example, organic solvents, namely alcohols or toluene and other hydrocarbons can be employed. Preferable among organic solvents are such alcohols as methanol and ethanol. The selection of the most favorable solvents is best effected in a particular case by sample testing. Most advantageous are highly diluted solutions of the chemical agents containing no more than 10% down to approximately 1% of the active chemical. This applies particularly to the aqueous solutions mentioned above.

Figure 2:
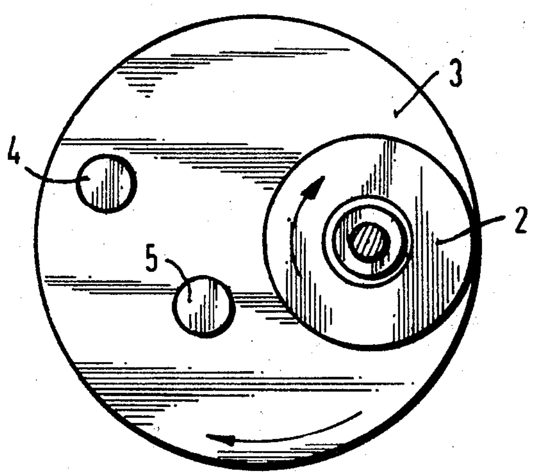

For further describing the invention, reference will be made to the accompanying drawing which shows schematically in FIG. 1 a side elevation, and in FIG. 2 a top view of a polishing device.

The method of the invention can be performed, for example, in the following manner. The semiconductor discs are placed upon the upper surface of a rotary platform or polishing disc of material having less hardness than that of the semiconductor discs so that the surface to be processed touches the upper surface of that disc and is subjected to frictional motion relative thereto, for example by rotating the polishing disc. It is preferable to fasten a number of semiconductor bodies 1 upon a carrier disc 2 by cementing them thereto. By rotating the carrier disc 2 and also the polishing disc 3, the semiconductor bodies are caused to perform the frictional motion relative to the polishing disc 3.

If desired, the semiconductor bodies or the carrier discs to which they are fastened can be fixedly mounted so that the friction comes about only by motion of the polishing disc. At least two, coactively polishing chemicals are separately supplied onto the polishing disc. Thus, in the illustrated embodiment of the polishing machine, the active top surface of the polishing disc 3 is larger than that of the carrier disc 2 so that the major portion of the polishing surface remains exposed. Two different chemicals in form of diluted solutions are separately dripped from respective containers 4 and 5 onto the exposed portion of the rotating polishing disc 3. In this manner, and in view of the small quantities of liquid supplied at a time, the surface of the polishing disc exhibits individual, sequential areas that are wetted by the respectively different chemical agents. When the semiconductor bodies 1 glide over the polishing disc 3, they enter into contact alternately with the different chemical agents. The same motion simultaneously acts to mix the chemical agents.

For accelerating the polishing effect, a catalyst can be employed which is either mixed with one of the respective chemical polishing agents or, if desired, may be supplied separately in the same manner as shown and described with respect to the polishing agents. A suitable catalyst, for example, is finely distributed silicon dioxide. Good results have been obtained with silicon dioxide powder of 10 to 40 millimicron grain size, admixed to either of the chemical agents or separately supplied as an aqueous suspension from another dripping vessel.

It is preferable to have each of the chemical polishing agents leave the polishing disc at approximately the same speed or rate at which the agent is supplied. This effect can be obtained simply by the fact that the liquid flows centrifugally outward and thus is squirted off the polishing disc 3. However, a current of air may be blown against the disc 3 immediately behind the carrier disc 2 so that the mixed or spent chemical agents are substantially removed ahead of the locality where new amounts of these agents are brought upon the polishing surface of disc 3. Thus the active portion of the polishing disc is virtually covered by fresh polishing agents only. It is preferable to continuously supply and remove the chemical agents. However, if desired, they may also be supplied and removed periodically. Best results are achieved when the respectively different chemical substances are employed in solutions having approximately the same concentration. In this case it is also advisable to supply the respective solutions in approximately the same quantities and at an approximately constant speed or rate.

Depending upon the size of the polishing disc and the number of semiconductor discs being processed simultaneously, and also dependent upon the relative speed between semiconductor discs and polishing disc, each of the different chemical substances can be dripped upon the polishing disc on a plurality of localities. However, the number of these localities is not critical. The polishing time depends upon various factors, for example upon the type of chemical substances employed, their concentration, and also upon the temperature at which the polishing treatment is being performed. Generally, a higher operating temperature reduces the time needed for a given amount of polishing. When operating at about 40° to 50° C., the length of processing times can be reduced to about one-half of that required at normal room temperature. A temperature substantially above 50° C. should be avoided. For technological and economical reasons, I have found it preferable to perform the method, as a rule, at or near normal room temperature (20–25° C.).

According to a modified mode of applying the invention, the process is performed in a plurality of stages. For example, the concentration of the chemical substances in the solutions, or at least the concentration of one of these substances, is reduced from stage to stage, performing the process otherwise in each stage in the same manner as described in the foregoing. Another way of proceeding in stages is to stepwise increase the viscosity of the different chemical polishing agents or their solutions, or at least the viscosity of one of these substances or solutions. Both of these expedients can be employed simultaneously. Thus, in the first polishing stage, two different agents, each in an about 10% solution, can be used for example, and in the second stage the two agents are each used in 5% solutions. For fine polishing in the last stage, a solution of 2% can then be employed for each of the two agents and, if desired, the viscosity of these solutions can be simultaneously increased by adding a highly viscous liquid such as glycol, glycerin, water glass or an oil such as silicone oil or paraffin oil. The amounts of viscous liquid are not critical; a proper range is readily determined by sample testing.

When processing germanium bodies in a polishing machine according to the method of the invention, the simultaneous use of aqueous hydrogen peroxide solution in about 4 to 8% concentration and an aqeous sodium lye in about 2 to 5% concentration has been found to be advantageous. Particularly favorable results are obtained if approximately equal quantities of the two solutions are dripped upon the polishing disc. In this case, the method can be performed in a relatively simple manner. The dripping rate of the solutions is adjusted at the beginning of the process and is maintained constant until the processing is terminated. Then the polishing travel of the semiconductor bodies and/or of the polishing disc is stopped and the semiconductor bodies are rinsed as promptly as possible, for example with water, for removal of the residual solutions. The method is preferably performed at room temperature (about 20° C.) relative to all constituents.

The various mode of performing the method are also applicable to other semiconductor materials, using the chemical etching or polishing agents suitable therefor. When processing silicon discs in this manner, the chemical agents preferably employed are hydrofluoric acid and nitric acid, each in aqueous solution of less than 10% concentration.

In an example of a plural-stage operation of the type described, relating to the processing of germanium, the last processing stage was performed by cementing approximately ten germanium pieces 1 upon a carrier disc 2 of iron. The diameter of the polishing disc 3 was 300 mm., the diameter of the carrier disc 2 was 135 mm. The diameter of the germanium bodies 1 was 25 mm. The carrier disc was placed upon the polishing disc so that the surfaces of the germanium discs were in contact with the polishing surface. The device was equipped with three such carrier discs to simultaneously perform rotational motion produced by friction, and the drip spouts of the vessels 4 and 5 were positioned between the carrier discs. Each carrier disc can be operated in the same sense as the polishing disc or can be driven in the opposite sense of rotation. In the particular example here described, the carrier discs were driven only from the polishing disc 1 and therefore had the same sense of rotation at a fixed speed ratio. Simultaneously with the mechanical operation, equal quantities of an approximately 4% hydrogen peroxide solution and an about 2% aqueous sodium lye were dripped from respectively different containers upon the polishing disc. The processing of the semiconductor disc was at 25° C. and was terminated in about three minutes. The surface of the germanium disc was found to be free of crystalline faults. Even under 800 times magnification, no faults were discernible in the crystalline structure or in the lattice structure. As a rule, a layer of about three micron thickness is removed within a polishing period of approximately one minute per germanium disc.

The rotary platform or polishing disc 3 need not have any mechanical abrasive on the surface thereof engageable with the semiconductor discs 1, since the different chemical polishing agents supplied to that surface from the containers 4 and 5 will coact to suitably polish the applied surface of the semiconductor discs.

Polishing of the semiconductor discs 1 is further enhanced by providing a granular surface on the polishing disc 3 which mechanically abrades the semiconductor discs while simultaneously supplying the different chemical polishing agents to that surface.

To those skilled in the art it will be obvious from a study of this disclosure that my invention permits of various modifications and hence can be given embodiments other than particularly illustrated and described herein, without departing from the essential features of my invention and within the scope of the claims annexed hereto.

I claim:

1. Polishing method for removing material from surfaces of monocrystalline semiconductor bodies, which comprises simultaneously dripping at least two different, co-actively polishing liquiform chemical agents, specific for etching the semiconductor bodies, at a given rate to spaced locations on the upper surface of a rotary, substantially horizontal platform, bringing a surface of a semiconductor body into engagement with the upper surface of the rotary platform so that it is repeatedly subjected to each of said different chemical polishing agents, and removing the polishing agents from the rotary platform at approximately the same rate as they are supplied thereto.

2. Polishing method according to claim 1, wherein the different, coactively polishing chemical agents are liquiform and are continuously dripped simultaneously onto the rotary platform at the spaced locations on the upper surface thereof.

3. The polishing method according to claim 2, wherein the respective chemical agents are supplied to the polishing device in the form of solutions of less than 10% down to about 1% concentration.

4. The polishing method according to claim 2, wherein the respective chemical agents are supplied to the polishing device as aqueous solutions of about 1 to 10% concentration.

5. Polishing method according to claim 2, including supplying a catalyst together with the chemical polishing agents to the upper surface of the rotary platform for accelerating the chemical polishing action.

6. Polishing method for removing material from surfaces of monocrystalline semiconductor bodies, which comprises simultaneously dripping at least two different, coactively polishing, liquiform chemical agents, specific for etching the semiconductor bodies, at a given rate onto a rotary, substantially horizontal platform at spaced locations on the upper surface thereof, bringing a surface of a semiconductor body into engagement with the upper surface of the rotary platform so that it is repeatedly subjected to each of said different chemical polishing agents, and removing the polishing agents from the rotary platform at approximately the same rate as they are supplied thereto, the bodies being formed of germanium and one of the chemical polishing agents consisting of a 4 to 8% hydrogen peroxide solution and another consisting of a 2 to 5% sodium hydroxide solution.

7. Polishing method according to claim 1, which comprises performing it in a plurality of stages, and modifying at least one of the chemical agents from stage to stage.

8. The polishing method according to claim 7, which comprises reducing the concentration of at least one of the agents from stage to stage.

9. The polishing method according to claim 7, which comprises increasing the viscosity of at least one of the agents from stage to stage.

10. The polishing method according to claim 6, which comprises increasing the viscosity of at least one of the chemical agents by adding substance from the group consisting of glycol, glycerin, water glass, paraffin oil and silicone oil.

11. A polishing method for removal of material from monocrystalline semiconductor bodies of germanium, which comprises subjecting the surface of the semiconductor bodies to mechanical polishing by frictional engagement thereof with a polishing disc in a mechanical polishing device, simultaneously subjecting the bodies in the device to at least two different, coactively polishing chemical agents consisting of a 4 to 8% hydrogen peroxide solution and a 2 to 5% sodium hydroxide solution respectively, dripping approximately equal amounts of said two agents simultaneously and spatially separately on the polishing disc and removing them therefrom at approximately the same speed.

12. A polishing method for removal of material from monocrystalline semiconductor bodies, which comprises performing in a plurality of stages the steps of subjecting the surface of the semiconductor bodies to mechanical polishing by frictional engagement thereof with a polishing disc in a mechanical polishing device, simultaneously subjecting the bodies in the device to at least two different, coactively polishing chemical agents specific for etching the semiconductor bodies, and supplying the respective agents simultaneously and spatially separately to the device and removing them therefrom at approximately the same speed, and modifying at least one of the chemical agents from stage to stage.

13. The polishing method according to claim 11, which comprises increasing the viscosity by adding substance from the group consisting of glycol, glycerin, water glass, paraffin oil and silicone oil.

14. A polishing method for removal of material from monocrystalline semiconductor bodies of silicon which comprises subjecting the surface of the semiconductor bodies to mechanical polishing by frictional engagement thereof with a polishing disc in a mechanical polishing device, simultaneously subjecting the bodies in the device to at least two different, coactively polishing chemical agents consisting of hydrofluoric and nitric acids respectively in a solution of less than 10% concentration, dripping approximately equal amounts of said two agents simultaneously and spatially separately on the polishing disc and removing them therefrom at approximately the same speed.

15. A polishing method for removal of material from monocrystalline semiconductor bodies of silicon which comprises subjecting the surface of the semiconductor bodies to mechanical polishing by frictional engagement thereof with a polishing disc in a mechanical polishing device, simultaneously subjecting the bodies in the device to at least two different, coactively polishing chemical agents consisting of hydrofluoric and nitric acids respectively in a solution of less than 10% concentration, dripping approximately equal amounts of said two agents simultaneously and spatially separately on the polishing disc and removing them therefrom at approximately the same speed, and increasing the viscosity of at least one of the chemical agents by adding substance from the group consisting of glycol, glycerin, water glass, paraffin oil and silicone oil.

References Cited

UNITED STATES PATENTS

| | | | |
|---|---|---|---|
| 2,740,699 | 4/1956 | Koury | 156—17 |
| 3,156,596 | 11/1964 | Sullivan | 156—17 |
| 3,226,277 | 12/1965 | Masuda et al. | 156—345 |

JACOB H. STEINBERG, *Primary Examiner.*

U.S. Cl. X.R.

134—80; 156—345, 5